Oct. 29, 1929.   J. A. ROSEMAN   1,733,133
POWER MOWER
Filed Jan. 23, 1926   2 Sheets-Sheet 1

Witness:

Inventor,
Joseph A. Roseman

Oct. 29, 1929.                J. A. ROSEMAN                 1,733,133
                                POWER MOWER
                           Filed Jan. 23, 1926          2 Sheets-Sheet 2
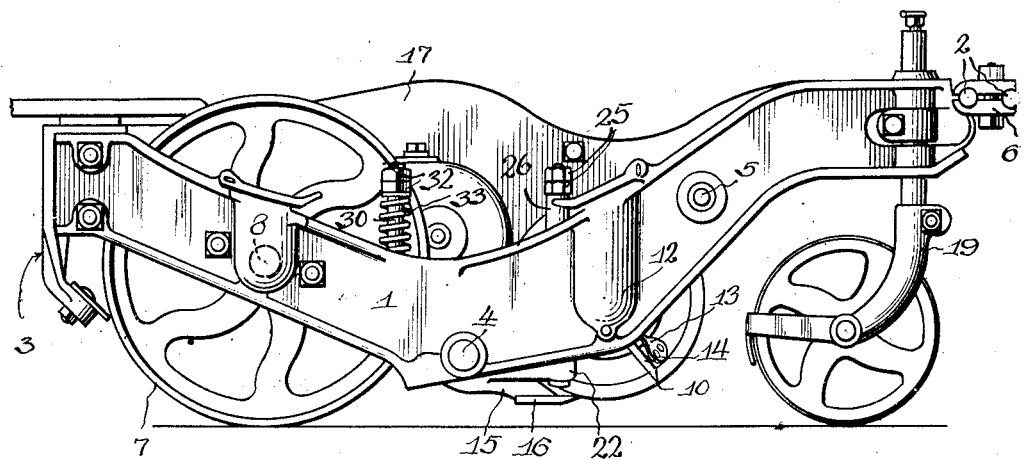
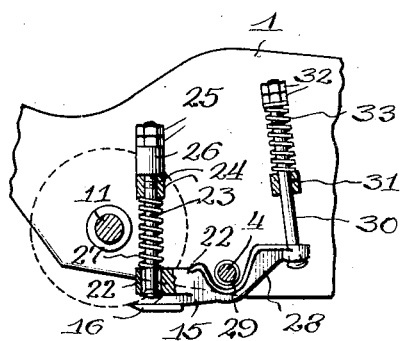
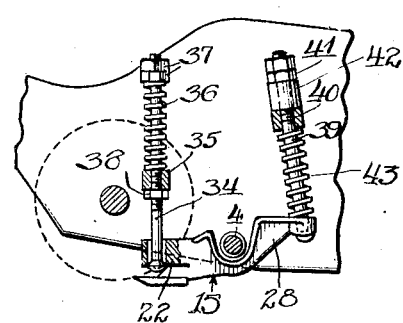
Witness:
Chas. R. Koursh.
Inventor,
Joseph A. Roseman Patented Oct. 29, 1929

1,733,133

UNITED STATES PATENT OFFICE

JOSEPH A. ROSEMAN, OF EVANSTON, ILLINOIS, ASSIGNOR TO ROSEMAN TRACTOR MOWER COMPANY, OF EVANSTON, ILLINOIS, A CORPORATION OF ILLINOIS

POWER MOWER

Application filed January 23, 1926. Serial No. 83,212.

This invention relates to improvements in power mowers, and more particularly to tractor drawn mowers used extensively for the cutting of large grassed areas and particularly the fairways of golf courses.

The object of the present invention is to provide an improved construction for mowers of the type disclosed in my prior Patent No. 1,561,569, dated November 17, 1925, and which may be generally described as consisting of a plurality of mower units drawn behind a tractor in a suitable gang formation to cover a relatively wide swath or path, the several units being hitched to a suitable frame, thus permitting them to articulate independently of each other as they cut over the surface, more or less undulating.

The improved feature embodying the present invention is applicable to the mower unit and has for its object the provision of an improved means for adjusting and regulating the cutting action, or in other words the relative positions of the fixed cutter blade and the rotary cutting element, these two members coacting to effect the scissor-like cutting action that is characteristic of this type of mower.

The chief difficulty experienced in the maintenance and operation of mowing apparatus is the adjustment of the cutter-blades, particularly in the hands of inexperienced operators. Mowers have always been equipped with various forms of adjusting devices, usually applied to the fixed knife-bar or bed-knife, as it is called, whereby the same may be shifted toward or from the path of the rotary cutter blades to compensate for the wear, and to otherwise insure a clean shearing cut throughout the full length of the cutting edges. These adjusting devices when positive in action and located at the ends of the cutter bar, and often at a third and intermediate point, require skill and care in manipulation, otherwise irregularity in cutting and injury to the cutting blades is the inevitable result. The present construction does away with the objectionable features of the heretofore haphazard methods of adjustment consisting generally of holding the cutter bar in equilibrium about an axis parallel with the cutting edge and applying counteracting forces thereto through springs, the tension or compression thereof being varied to bring about the adjustments of the cutter bar.

A preferred construction for bringing about the results sought to be accomplished, is disclosed in the accompanying drawings, in which—

Figure 2 is a view in side elevation of the mower unit.

Figure 3 is an enlarged detail view in cross section taken on line 3—3 of Figure 1, showing the parts of the knife bar adjustment.

Figure 4 is an enlarged detail view taken on line 4—4 of Figure 1; and

Figure 5 is an enlarged detail view similar to Figure 3 and showing a modified arrangement of the knife-bar adjustment.

Figure 1:
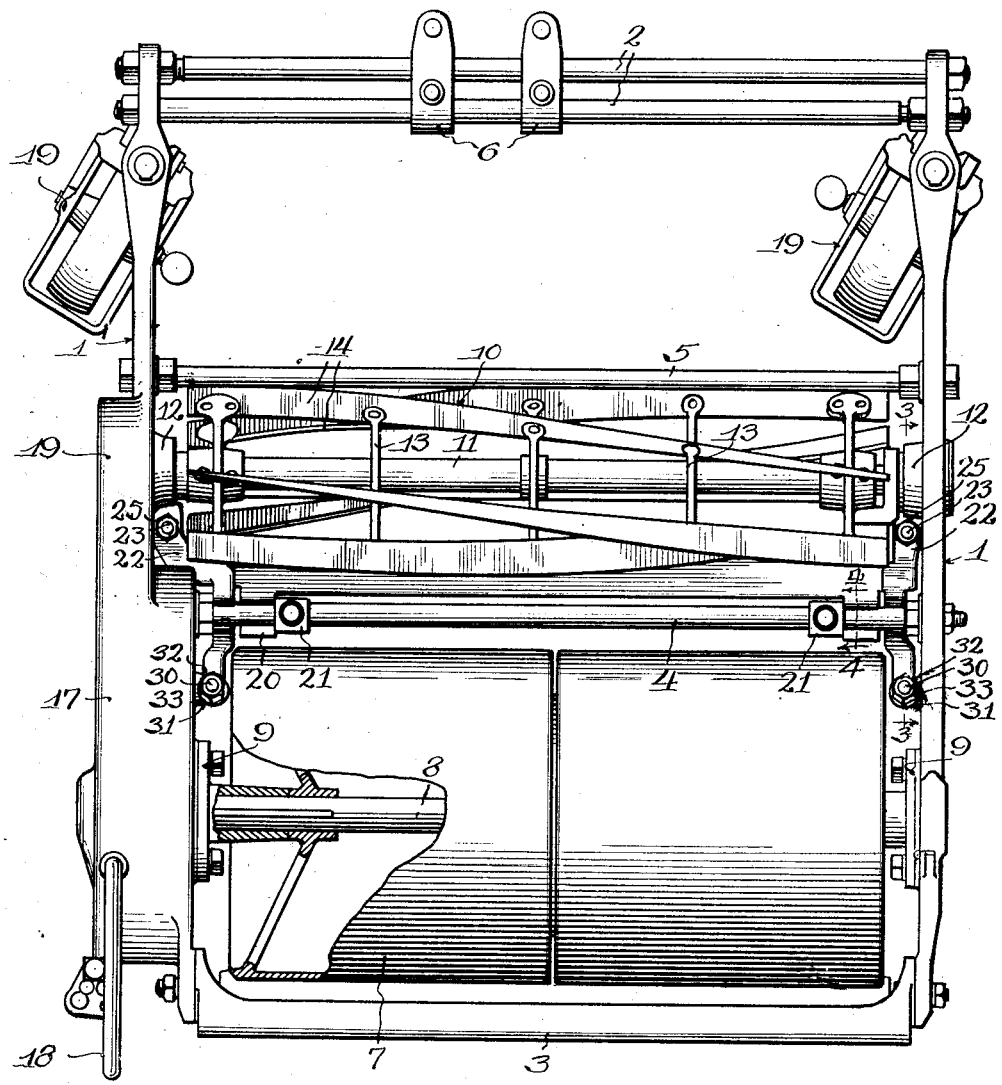
Figure 1 is a top plan view of a mower unit embodying the invention.

The mower unit comprises in general, a frame rectangular in shape and consisting of side frame members 1, 1, connected together in parallel and spaced relation by means of a plurality of transverse members, namely, a pair of tie rods 2 at the forward end, a cross bar 3 at the rear end, and two tie rods 4 and 5 between the front and rear ends, one of these rods 4, being located practically midway between the ends of the side frame members and near their lower edges, while the other rod 5, is located forwardly between the rod 4 and the pair of tie rods 2, at the forward end. Carried on the rods 2 at the front end of the unit is a pair of clevises 6, whereby the unit is secured, by links or otherwise, to the draft frame to which all of the units are similarly connected.

The side frame members are curved from end to end, with their central portions depressed and brought into close proximity to the ground level, as shown in Figure 2. At the rear of the unit is a large roller 7 extending the full width between frame members and mounted on a shaft 8 which is journalled in suitable bearings 9, 9, in the side frame members. This roller is preferably made in two sections or halves capable of rotating at different speeds when the unit is travelling in a circular path. A suitable form of differential mechanism (not shown) is introduced between the two sections of the roller and the shaft, which allows the roller section on the inside of the circular path to lag behind the section on the outside. It is not thought necessary to go into further detail as to the roller since it forms no part of the present improvement.

Just forwardly of the roller is the rotary cutting element or reel 10 consisting as usual of a shaft 11, journalled at its ends on bearings 12, in the side frame members 1, 1, and a plurality of spiders 13, spaced apart throughout its length and carrying a series of helical cutting blades 14, the path of the cutting edges of these blades being represented in Figure 3 as a circle for convenience.

Immediately beneath the reel 10, but rearwardly with respect to the blade circle, is the relatively fixed knife bar or bed knife 15 extending between the side frame members and carrying the knife blade 16 extending forwardly just above the ground and engaging the edges of the rotary cutting blades at its forward edge. The manner of supporting the knife bar will be presently described.

Forming a part of one of the side frame members, namely that on the left in Figure 1, is a gear casing 17, within which is housed the gearing for driving the cutter shaft 11 from the roller shaft 8, and consisting of a train of gears suitable gear ratio calculated to rotate the cutter at a speed considerably greater than the speed of the roller. There being nothing unusual in the cutter drive, a detailed disclosure and description has been omitted.

Associated with the cutter drive is suitable clutch mechanism operative to disengage the roller shaft 8 from the gear train by means of a hand clutch lever 18. The purpose of the clutch mechanism is to make it possible to transport the mower over the ground without cutting. At the forward end of the frame members 1, 1, are mounted casters 19, 19, which support the unit in rolling contact with the ground, in conjunction with the main roller 7.

Referring now to the mounting and adjustment of the bed knife 15, the same has bearing on the cross-rod 4 through the medium of bearing members 20, located a short distance inwardly from each end. These bearing members are semi-circular, with the bearing seat facing upwardly and engaging the lower half or semi-circumference of the rod. It may be explained that while the rod 4 acts as a fulcrum for the movement of the knife bar in its adjustment, that the forces acting on the bar tending to hold the bearing against the rod are in an upward direction, and therefore a half bearing is preferably employed, so that the knife bar can be removed from the frame without taking the unit apart. Mounted on the rod 4, and inwardly from the bearings, are collars 21, held in place by set screws. These collars serve to determine the position of the knife bar lengthwise of the rod.

In addition to the bearings 20, there are yieldable adjusting means as follows: At the ends of the knife-bar and adjacent the inside surface of the side frame members are two forwardly extending integral arms 22, 22. Passing upwardly through a hole at the end of each arm 22 is a bolt 23 headed at its lower end and having a relatively long shank with a threaded end portion which extends through a boss 24, integral with the adjacent side frame member. The threaded end of the bolt carries adjusting nuts 25, located above the boss and with a bushing or collar 26 therebetween. Mounted on the shank of the bolt between the boss 24 and the end of the arm 22, is a coil spring 27 with its ends bearing against said arm 22 and boss 24, respectively.

Extending rearwardly from each end of the knife-bar are arms 28, 28, which may either be formed integral with the bar, or formed separate and connected thereto. The arms 28 are in effect rearward prolongations of the arms 22, and extend substantially the same distance rearwardly of the fulcrum rod 4, as do the arms 22 forwardly thereof. Moreover, the arms 28 are depressed into U-shape inwardly from their extremities, as at 29, so as to pass beneath the rod 4, with sufficient clearance to avoid bearing contact. Passing upwardly through the ends of each of the arms 28, is a bolt 30, similar to but having a slightly longer shank than the bolt 23 of the forward adjusting device. This bolt passes upwardly through a boss 31, located somewhat nearer the end of the arm, so that a substantial part, if not more than half the length, of the shank extends beyond the boss. Adjusting nuts 32 are mounted at the upper threaded end of the bolts, and between the same and the boss 31 is a coil spring 33 of substantially the same length and strength as the forward spring 27.

The forces of the two springs 27 and 33, one acting vertically downward against the arm 22, and the other acting vertically upward through its bolt 30 at the end of the arm 28, both tend to rotate the knife-bar in a counterclockwise direction about the rod 4 at the rear bearings 20, that is, in a direction to shift the knife-blade 16 away from the circle of the reel. But the combined effect of these forces is opposed positively by the forward adjusting bolt 23 which in any given position of adjustment is the equivalent of a fixed tie rod, holding the knife-bar positively against movement away from the path of the rotary cutter blades.

Thus by turning down the adjusting nuts 25 on the bolts 23, 23, the knife-bar 15 is rotated slightly on its bearings in a direction to bring the knife edge toward the cutter blades, and against the compression of the two springs 27 and 33, whereas the loosening or backing off of the same adjusting nuts permits the springs to act, forcing the knife-bar in the opposite direction and away from the reel.

The two sets of springs are held under constant compression and exert substantially equal forces on the knife-bar, which would be the equivalent of a single large spring acting directly in a downward direction against the ends of the forward arms 22. Thus for ordinary adjustment the forward nuts 25 would only be loosened or tightened, but in order to vary the amount of compression acting on the bar, the rear adjusting nuts 32 would be loosened or tightened, this being accomplished without affecting the adjustment of the knife-bar. Hence this arrangement provides for a main adjustment and an auxiliary adjustment, one directly affecting the movement of the knife-bar and the other regulating the force opposing the positive action of the forward bolts 23.

Thus providing two springs acting on opposite sides of the axis of the knife-bar has several advantages. In the first place the spring action is divided between the two springs in such a way as to obtain the advantage of greater leverage and the distribution of the forces on both sides of the fulcrum, and secondly, it provides for an auxiliary adjustment capable of relieving or increasing the tension exerted on the knife-bar and thus compensating for wear in the parts.

As a modification of the arrangement disclosed in Figures 1 to 3, that of Figure 5 is disclosed. Such an arrangement practically amounts to a reversal of the two adjusting bolts with their springs, as will be evident from a comparison of Figures 3 and 5.

Thus in the modified construction, the bolt 30 becomes bolt 34, mounted forward, i. e., on the cutter side of the fulcrum rod 4 and passing upwardly through the boss 35, similar in all respects to the boss 24, although preferably lowered to avoid unnecessarily lengthening the bolt 34. Above the boss is mounted a spring 36 with the adjusting nuts 37 at the upper ends of the bolt. Just below the boss 35 is a stop nut 38 which turns on the bolt shank, the same being threaded throughout the portion adjacent said nut.

At the rear end of each of the arms 28, are bolts 39 each with its end passing through a boss 40 and carrying adjusting nuts 41 and a collar 42, above the boss, as well as a compression spring 43 below the boss bearing against the end of the arm.

This reversal of the two spring bolts has the effect of reversing the direction of the forces exerted on the knife-bar 15 by the springs, so that the tendency is to yieldingly force the knife toward the reel by exerting their combined forces in a clockwise direction. This spring tension is opposed by the stop-nut 38 on the bolt 34, which bears against the forward boss 35, thus determining the spacing of the knife blade from the reel circle, the shank of the bolt becoming a compression member. The tension of the springs is regulated by the adjusting nuts, as before, but instead of regulating the knife-bar by backing off or tightening the forward adjusting nuts, the stop-nut serves the same purpose, by shortening or lengthening the intermediate portion of the forward bolt shank between the boss 35 and the end of the arm 22. Thus the knife-bar is yieldingly held to its cutting position. By this arrangement such objects as pieces of metal, stones or the like, encountered during the operation of the mower, would not subject the cutting blades to possible damage or breakage since the knife-bar would yield sufficiently to permit the object to pass through or be expelled without jamming.

I claim as my invention:

1. A mower comprising a frame including side frame members, a cutting reel extending transversely of said frame and journalled at its ends in said side frame members, a rod extending transversely between said side frame members rearwardly of said reel, a knife-bar having a forward cutting edge adapted to coact with said reel, and a plurality of upwardly facing semi-circular bearing members at its rear edge bearing upwardly against said rod, and means for adjusting said knife-bar comprising a pair of bolts adjacent each end thereof, and passing upwardly through the ends of integral arms extending forwardly and rearwardly from the axis of said bearing members, bosses on said side frame members through which the upper ends of said bolts pass, coil springs mounted on said bolts and adapted to exert pressure on said bar in opposite directions, and adjusting nuts mounted on said bolts.

2. A mower comprising a frame including side frame members, a cutting reel extending transversely of said frame and journalled at its ends in said side frame members, a rod extending transversely between said side frame members and rearwardly of said reel, a knife-bar extending parallel with said reel and having a forward cutting edge coacting therewith, and lugs projecting from its rear edge forward to provide upwardly facing semi-circular bearing members bearing upwardly against said rod, and means for adjusting said knife-bar comprising a pair of bolts at each end of said bar, connected at their lower ends with a pair of integral lever arms projecting forwardly and rearwardly from the axis of said bearing members, and passing through bosses integral with the side frame members, coil springs mounted on said bolts and nuts mounted on the ends thereof, one of said springs being positioned between its boss and lever arm and the other between its boss and the adjusting nut.

Signed at Chicago, Ill., this 12th day of January, 1926.

JOSEPH A. ROSEMAN.